US009305518B2

(12) United States Patent
Yoshimura et al.

(10) Patent No.: US 9,305,518 B2
(45) Date of Patent: Apr. 5, 2016

(54) IMAGE DISPLAY APPARATUS AND METHOD FOR CORRECTING LUMINANCE UNEVENNESS PRODUCED BY IMAGE DISPLAY APPARATUS

(71) Applicant: SEIKO EPSON CORPORATION, Tokyo (JP)

(72) Inventors: Jun Yoshimura, Beppu (JP); Makoto Kobayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 159 days.

(21) Appl. No.: 14/026,616

(22) Filed: Sep. 13, 2013

(65) Prior Publication Data

US 2014/0092117 A1 Apr. 3, 2014

(30) Foreign Application Priority Data

Oct. 2, 2012 (JP) ................................ 2012-220252

(51) Int. Cl.
*G09G 3/36* (2006.01)
*G09G 5/00* (2006.01)
*G09G 5/02* (2006.01)
*G09G 3/20* (2006.01)
(Continued)

(52) U.S. Cl.
CPC .................. *G09G 5/02* (2013.01); *G09G 3/002* (2013.01); *G09G 2310/0221* (2013.01); *G09G 2320/0233* (2013.01); *G09G 2320/0242* (2013.01); *G09G 2320/0271* (2013.01); *G09G 2320/0285* (2013.01); *G09G 2320/0606* (2013.01); *G09G 2320/0666* (2013.01); *G09G 2320/0693* (2013.01)

(58) Field of Classification Search
CPC ..... G09G 3/2003; G09G 3/3607; G09G 5/00; G09G 5/02; G09G 5/30; G09G 2320/0271; G09G 2320/0276; G09G 2320/00; G09G 2320/02; G09G 2320/0209; G09G 2320/0233; G09G 3/36; G09G 3/20; G09G 2320/0242; G09G 2320/06; G09G 2320/062; G09G 2320/0626; G09G 2320/0633; G09G 2320/0646; G09G 2320/066; G09G 2320/0666; H04N 1/60; H04N 1/6027; H04N 1/6058; H04N 5/2354; H04N 5/57; H04N 5/58; H04N 2005/44517; H04N 9/3182; H04N 1/407; G03B 21/00; G03B 21/14; G02F 1/13; G02F 1/133
See application file for complete search history.

(56) References Cited

U.S. PATENT DOCUMENTS 7,408,569 B1 * 8/2008 Yamaguchi .................. 348/125
2005/0134534 A1 * 6/2005 Yamada et al. ................. 345/63
(Continued)

FOREIGN PATENT DOCUMENTS

JP A-2009-020206 1/2009
JP A-2009-147431 7/2009

*Primary Examiner* — Wesner Sajous
(74) *Attorney, Agent, or Firm* — Oliff PLC

(57) ABSTRACT

An image display apparatus capable of providing a luminance unevenness correction capability that allows a user to readily visually grasp the correction is provided. An image display apparatus that includes an OSD display section that displays pattern images showing areas for luminance adjustment in an image, a pattern image selection operation section that accepts selection of any of the displayed pattern images, a luminance adjustment operation section that accepts operation of adjusting the luminance of the image, and a luminance correction section that adjusts the luminance of the image in the area for luminance adjustment corresponding to the selected pattern image.

7 Claims, 7 Drawing Sheets

(51) Int. Cl.

| | |
|---|---|
| ***H04N 1/40*** | (2006.01) |
| ***H04N 5/57*** | (2006.01) |
| ***G02F 1/13*** | (2006.01) |
| ***G03B 21/00*** | (2006.01) |
| ***G09G 3/00*** | (2006.01) |

(56) References Cited

U.S. PATENT DOCUMENTS

| | | | | |
|---|---|---|---|---|
| 2005/0185233 | A1* | 8/2005 | Baba et al. | 359/9 |
| 2005/0201622 | A1* | 9/2005 | Takarada | 382/218 |
| 2006/0002604 | A1* | 1/2006 | Sakai et al. | 382/141 |
| 2007/0081182 | A1* | 4/2007 | Shiohara | 358/1.13 |
| 2008/0015802 | A1* | 1/2008 | Urano et al. | 702/81 |
| 2008/0186334 | A1* | 8/2008 | Seetzen | 345/690 |
| 2009/0245682 | A1* | 10/2009 | Imai | 382/275 |
| 2010/0265403 | A1* | 10/2010 | Hikosaka | 348/607 |
| 2011/0148904 | A1* | 6/2011 | Kotani | 345/589 |
| 2011/0268358 | A1* | 11/2011 | Ikebe et al. | 382/172 |
| 2013/0135628 | A1* | 5/2013 | Kuno | 358/1.2 |
| 2013/0343632 | A1* | 12/2013 | Urano et al. | 382/149 |

* cited by examiner

IMAGE DISPLAY APPARATUS AND METHOD FOR CORRECTING LUMINANCE UNEVENNESS PRODUCED BY IMAGE DISPLAY APPARATUS

CROSS-REFERENCE TO RELATED APPLICATION

The entire disclosure of Japanese Patent Application No. 2012-220252, filed Oct. 2, 2012 is expressly incorporated by reference herein.

BACKGROUND

1. Technical Field

The present invention relates to an image display apparatus that displays an image on an image display surface and a method for correcting luminance unevenness produced by the image display apparatus.

2. Related Art

There is a known liquid-crystal-panel-based image display apparatus of related art that automatically corrects luminance unevenness (color unevenness) produced when an optical characteristic (transmittance or reflectance) of a component of each liquid crystal panel varies. For example, JP-A-2009-147431 discloses a projection-type image display apparatus that projects an image formed by a plurality of color light fluxes each of which has a predetermined grayscale and corrects luminance unevenness in each of a plurality of areas of the projected image based on a result obtained by capturing the projected image with an imaging device.

The luminance unevenness correction made by the image display apparatus described above, however, has a difficulty for a user of the apparatus in visually grasping how the luminance unevenness in an image is actually corrected. The image display apparatus described above also has a problem of an increase in cost because an imaging device is required to perform the luminance unevenness correction.

SUMMARY

An advantage of some aspects of the invention is to provide an image display apparatus capable of providing a low-cost luminance unevenness correction capability that allows a user to readily visually grasp the correction and a method for correcting luminance unevenness produced by an image display apparatus.

An aspect of the invention is directed to an image display apparatus that displays an image modulated by a light modulator on an image display surface, and the apparatus includes an OSD display section that displays pattern images showing areas for luminance adjustment in the image, a pattern image selection operation section that accepts selection of any of the displayed pattern images, a luminance adjustment operation section that accepts operation of adjusting the luminance of the image, and a luminance correction section that adjusts the luminance of the image in the area for luminance adjustment corresponding to the selected pattern image in accordance with the operation accepted by the luminance adjustment operation section.

Another aspect of the invention is directed to a method for correcting luminance unevenness produced in an image display apparatus that displays an image modulated by a light modulator on an image display surface, and the method includes displaying pattern images showing areas for luminance adjustment in the image, accepting selection of any of the displayed pattern images, and adjusting the luminance of the image in the area for luminance adjustment corresponding to the selected pattern image in accordance with operation of adjusting the luminance of the image.

According to the configurations described above, the luminance of an image can be adjusted based on a pattern of an area for luminance adjustment corresponding to the pattern image selected in accordance with the user's luminance adjustment operation. That is, when the user recognizes that luminance unevenness has occurred in an image displayed on the image display surface, such as a screen and a display, the user can correct the luminance unevenness by performing luminance adjustment on the area for luminance adjustment while looking at the image. The user can thus make the correction while visually grasping how the luminance unevenness in the image is actually corrected.

Further, since no camera or any other imaging device is required, luminance unevenness can be corrected at a low cost.

In the image display apparatus according to the aspect of the invention, it is preferable that the pattern images are formed of at least one of: a pattern image that indicates any of an upper left area, a left area, a lower left area, an upper right area, a right area, a lower right area, an upper area, and a lower area of the image as the areas for luminance adjustment in the image; and a pattern image that sets the entire image to be the area for luminance adjustment.

According to the configuration described above, an area on which the luminance adjustment is made can be selected from the entirety of the image and the areas of the image extending in the eight directions, whereby the user can readily select an area of the image where the user desires to correct the luminance.

In the image display apparatus according to the aspect of the invention, it is preferable that the image display apparatus further includes a grayscale selection operation section that accepts operation of selecting a grayscale at which the luminance is desired to be adjusted, and luminance adjustment at the grayscale selected by using the grayscale selection operation section is performed on the area for luminance adjustment corresponding to the pattern image selected by using the pattern image selection operation section. Further, in the process described above, an image showing the selected grayscale is preferably displayed on the image display surface.

According to the configuration described above, the luminance correction can be made by using a selected grayscale image (reference image). That is, since the luminance correction can be made by using a single-colored image, the user can readily visually recognize luminance unevenness.

Selectable grayscales are preferably five-step grayscales, white, bright gray, gray (middle between bright gray and dark gray), dark gray, and black.

In the image display apparatus according to the aspect of the invention, it is preferable that the luminance correction section performs the luminance adjustment for each of red, green, and blue components.

According to the configuration described above, the luminance adjustment can be made for each of the red, green, and blue components, whereby the user can perform fine-grained luminance adjustment.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
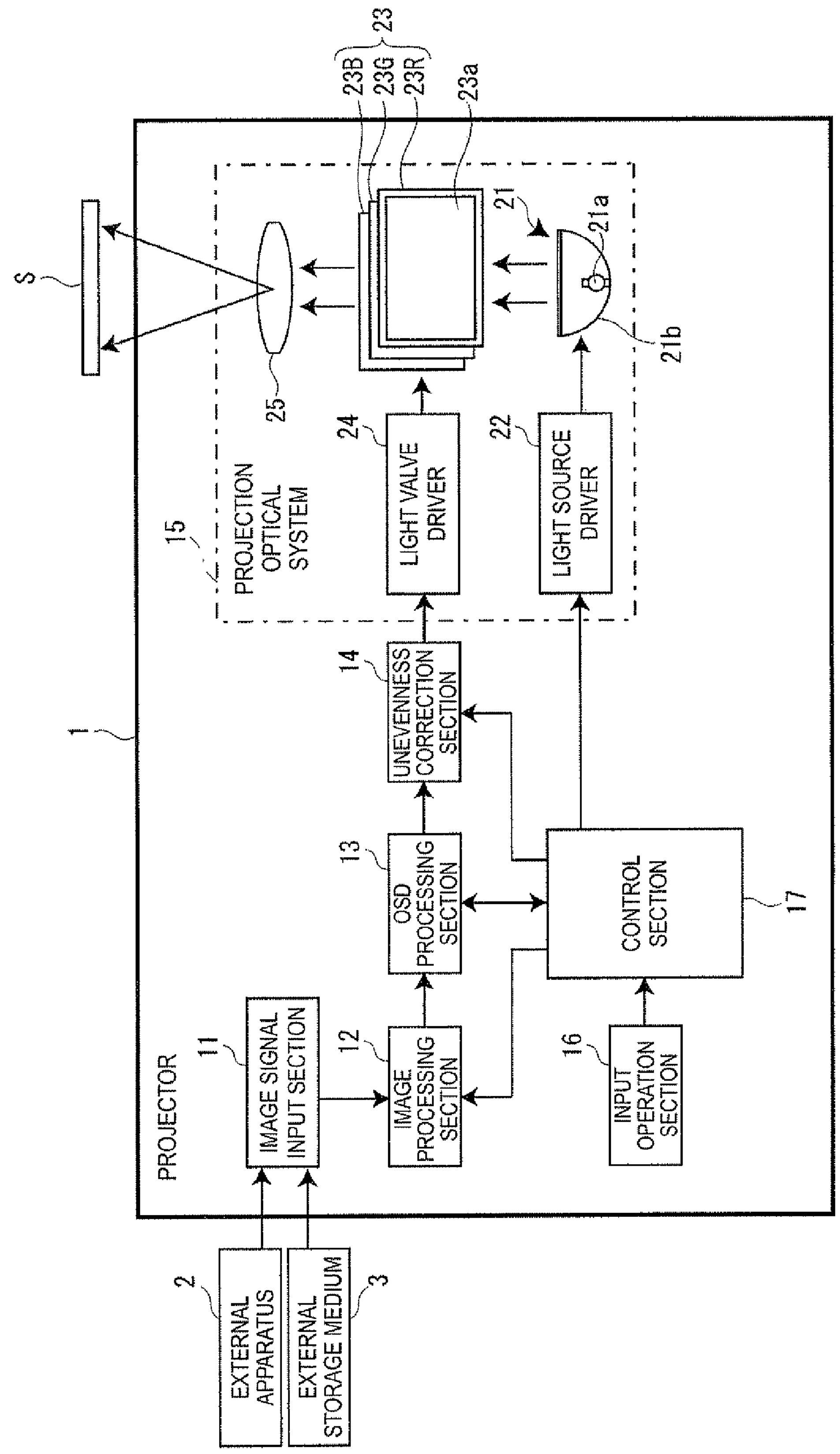
FIG. 1 is a block diagram showing the configuration of a projector according to an embodiment of the invention.

An image display apparatus and a method for adjusting an image displayed by an image display apparatus according to an embodiment of the invention will be described below with reference to the accompanying drawings. In the present embodiment, the description will be made of a projector 1 as an example of the image display apparatus. FIG. 1 is a block diagram showing the configuration of the projector 1. The projector 1 includes an image signal input section 11, an image processing section 12, an OSD processing section 13, an unevenness correction section 14 (luminance correction section), a projection optical system 15, an input operation section 16, and a control section 17, which controls the components described above, as shown in FIG. 1.

The image signal input section 11 receives image information (image signal) as an input from an external apparatus 2, such as a personal computer and a DVD player, or an external storage medium 3, such as a USB memory and a compact flash® memory.

The image processing section 12 performs predetermined image processing on the image information inputted from the image signal input section 11 based on an image processing program stored in advance. Examples of the predetermined image processing include resolution conversion, sharpness adjustment, and other types of image quality adjustment.

The OSD processing section 13 superimposes an OSD (on-screen display) screen formed, for example, of a menu image and a message image (OSD images) on the image information inputted from the image processing section 12 based on an instruction from the control section 17. The OSD processing section 13 includes an OSD memory (not shown), which stores OSD image information representing graphic forms, fonts and other objects for forming the OSD images. When the control section 17 instructs superimposition of an OSD image, the OSD processing section 13 reads necessary OSD image information from the OSD memory and superimposes the OSD image information on the inputted image information in a predetermined position thereof. The image information combined with the OSD image information is outputted to the unevenness correction section 14. On the other hand, when no instruction of superimposition of an OSD image has been issued from the control section 17, the OSD processing section 13 outputs the image information inputted from the image processing section 12 as it is to the unevenness correction section 14. The OSD processing section 13 is a primary component of the "OSD display section" in the appended claims.

The unevenness correction section 14 corrects luminance unevenness in the image information inputted from the OSD processing section 13 based on an instruction from the control section 17 and outputs the corrected image information to a light valve driver 24. When no instruction of correction of luminance unevenness in the image has been issued from the control section 17, the unevenness correction section 14 outputs the image information inputted from the OSD processing section 13 as it is to the light valve driver 24.

The projection optical system 15 projects an image on a projection surface S (image display surface), such as a screen, and includes a light source portion 21, a light source driver 22, liquid crystal light valves 23 (light modulators), the light valve driver 24, and a projection lens 25.

The light source portion 21 is formed of a light source lamp 21*a*, which is formed, for example, of a halogen lamp, a metal halide lamp, or a high-pressure mercury lamp, and a reflector 21*b*, which reflects light emitted from the light source lamp 21*a* in a substantially fixed direction. The light having exited out of the light source portion 21 (illumination light) is divided by a light separation optical system (not shown) into red (R), green (G), and blue (B) color components, which are then incident on the liquid crystal light valves 23 (23R, 23G, and 23B) for the RGB colors. The light source driver 22 controls start and stop of electric power supply to the light source portion 21 to switch the state of the light source portion 21 between a light-on state and a light-off state based on an instruction from the control section 17.

Each of the liquid crystal light valves 23 is formed, for example, of a liquid crystal panel having a liquid crystal material sealed between a pair of transparent substrates. Each of the liquid crystal light valves 23 has a rectangular pixel area 23*a* formed of a plurality of pixels arranged in a matrix, and a drive voltage is applicable to the liquid crystal material on a pixel basis. The light valve driver 24 sets light transmittance of each of the pixels in the liquid crystal light valves 23 by applying a drive voltage according to the image information to the pixel.

In the thus configured projection optical system 15, the light having exited out of the light source portion 21 passes through the pixel areas 23*a* of the liquid crystal light valves 23, where the light is modulated, and images according to the image information are formed by the respective color light fluxes. The thus formed RGB color images are combined with each other on a pixel basis by a light combining optical system (such as dichroic prism, not shown), and the resultant image is projected on the projection surface S through the projection lens 25.

The input operation section 16 accepts input operation from a user and includes a plurality of operation keys through which the user issues a variety of instructions to the projector 1. Example of the operation keys include a power key that switches the state of a power source between ON and OFF, a menu key that displays an OSD menu screen and stops displaying the OSD menu screen, through which a variety of settings are made, a determination key that finalizes an item selected on the OSD menu screen or any other screen, four direction keys corresponding to the up, down, right, and left directions, and a cancel key that allows the user to cancel an action and return to the previous action (screen) The input operation section 16 is a primary component of the "pattern image selection operation section", the "luminance adjustment operation section," and the "grayscale selection operation section" in the appended claims.

When the user operates any of the variety of operation keys on the input operation section 16, the input operation section 16 outputs an operation signal according to the user's operation to the control section 17. In the present embodiment, the input operation section 16 is primarily used as an operation section for adjusting luminance unevenness (color unevenness) in an image based on an in-image luminance unevenness adjustment function provided as a function of the OSD menu (which will be described later in detail).

The input operation section 16 may instead be formed of a remote control (not shown) that is remotely operable. In this case, the remote control transmits an infrared operation signal according to user's operation, and a remote control signal receiver (not shown) receives the operation signal and forwards it to the control section 17.

The control section 17 is formed, for example, of a CPU (central processing unit), a ROM (read only memory), and a RAM (random access memory). The CPU is a central processing unit that performs a variety of types of computation and oversees and controls the projector 1 based on inputs and outputs of signals from and to the components in the projector 1. The ROM stores a control program and control data used by the CPU that performs the variety of types of computation. The control program contains the image processing program used by the image processing section 12 and the unevenness correction section 14 described above. The RAM is used as a working area where the CPU performs the variety of types of computation.

Figure 2:
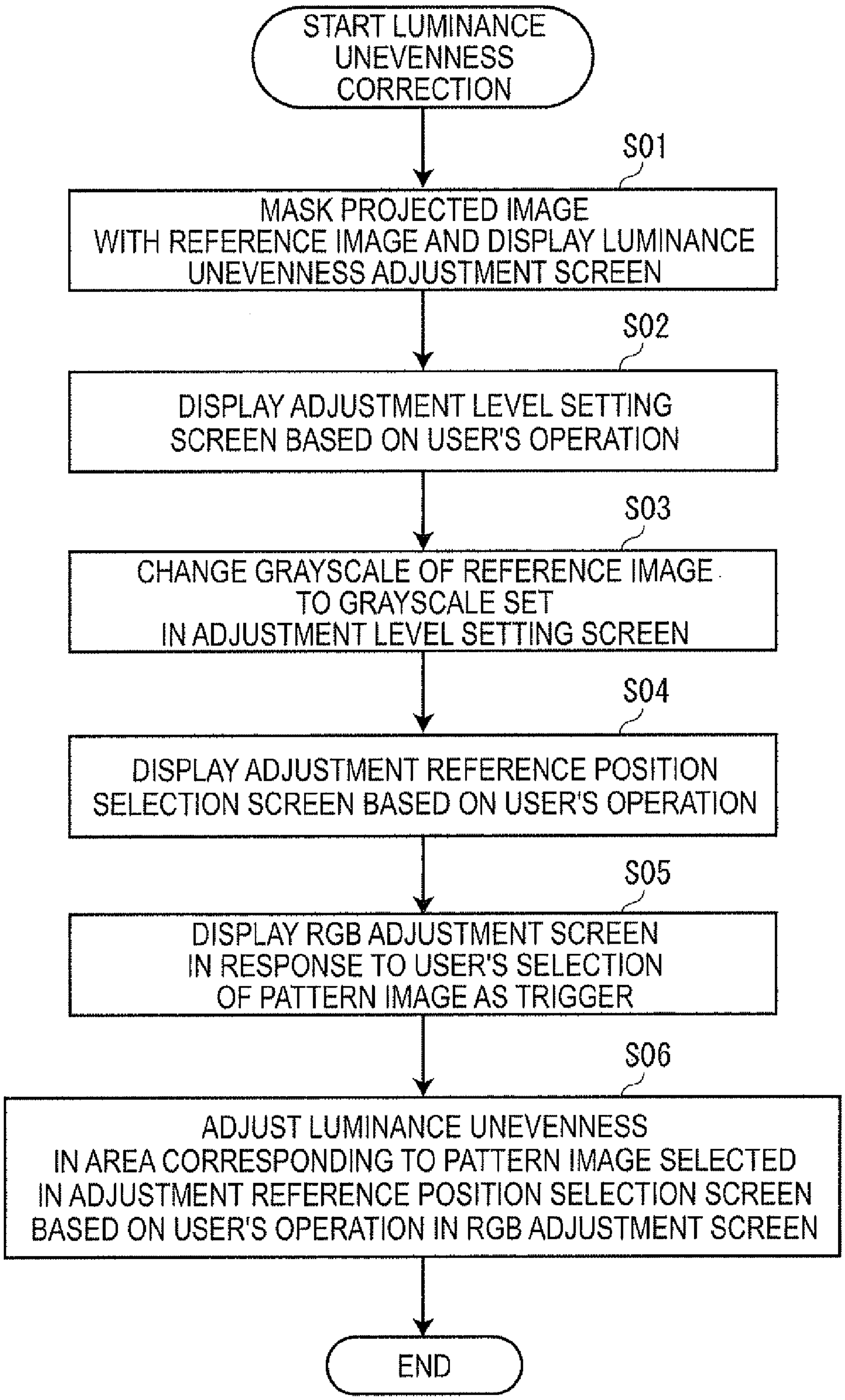
FIG. 2 is a flowchart showing the procedure of luminance unevenness correction.

The action of the projector 1 that performs luminance unevenness correction will next be described with reference to FIGS. 2 to 7. FIG. 2 is a flowchart showing the procedure of the luminance unevenness correction. FIGS. 3, 4A and 4B, 5, and 6A and 6B describe an example of each operation screen (OSD screen) operated by the user when the user performs the luminance unevenness correction and an example of a method for operating each of the operation screens.

First, when the user operates the OSD menu screen and selects an item "luminance unevenness adjustment (uniformity)," the control section 17 of the projector 1 masks a currently projected image (image based on image information inputted through image signal input section 11) with an image corresponding to a predetermined grayscale set in advance ("white," for example) (hereinafter referred to as "reference image G (see FIGS. 6A and 6B)") and instructs the OSD processing section 13 to superimpose and display a luminance unevenness adjustment screen D01 (see FIG. 3) on the reference image G (S01 in FIG. 2). The method for producing the image described above (display method) is presented by way of example and is not necessarily used. That is, the control section 17 may use any method capable of displaying a predetermined grayscale image as a projected image.

Figure 3:
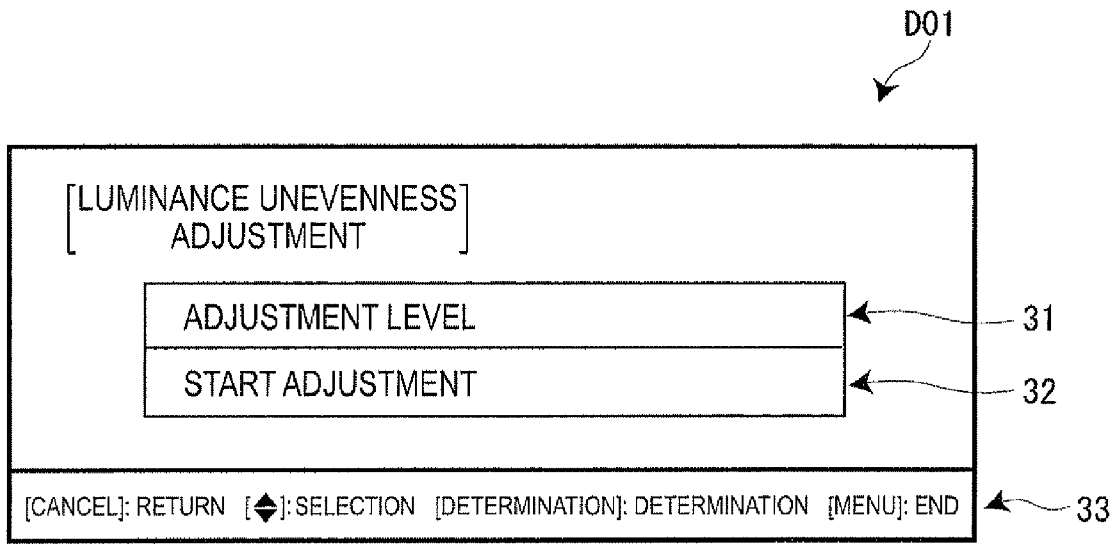
FIG. 3 describes a luminance unevenness adjustment screen.

In the luminance unevenness adjustment screen D01 are displayed the following two choices: an "adjustment level 31," which is selected when the user desires to adjust (change) the grayscale of the reference image G described above; and an "start adjustment 32," which is selected when the user desires to actually start adjusting luminance unevenness in an image, and operation guidance information 33, which gives the user guidance of operable keys among the operation keys provided on the input operation section 16 and guidance of the actions of the operable keys, as shown in FIG. 3.

Thereafter, when the user operates the displayed luminance unevenness adjustment screen D01 (in the state of S01 in FIG. 2) and selects the "adjustment level 31," the control section 17 superimposes and displays an adjustment level setting screen D02 (see FIGS. 4A and 4B) on the reference image G (S02 in FIG. 2).

Figure 4A:
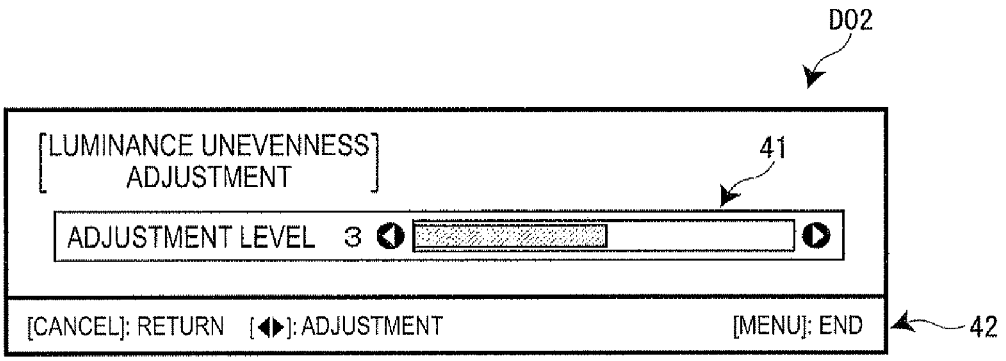
FIG. 4A describes an adjustment level setting screen, and FIG. 4B describes grayscale adjustment by using an adjustment level gauge.
Figure 4B:
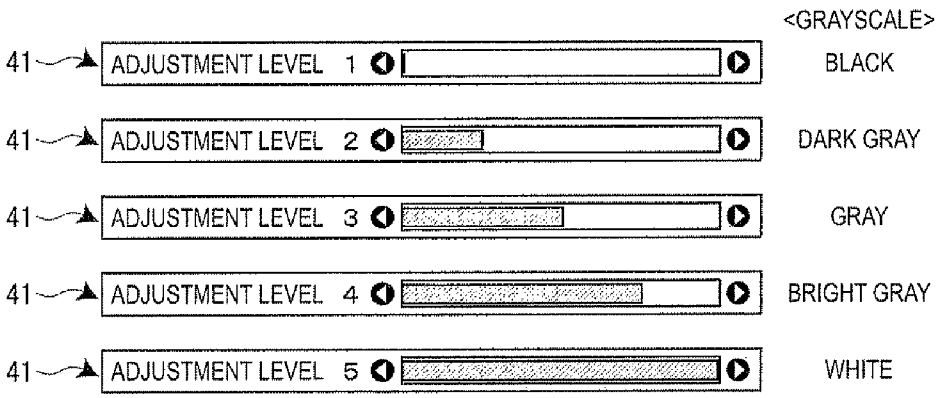

In the adjustment level setting screen D02 are displayed an adjustment level gauge 41 for adjusting (changing) the grayscale of the reference image G and operation guidance information 42, as shown in FIG. 4A. In the present embodiment, the grayscale of the reference image G can be adjusted to any of the following five levels by operation of the adjustment level gauge 41: "black," "dark gray," "gray (middle between bright gray and dark gray)," "bright gray," and "white." Specifically, the user can set the grayscale of the reference image G by operating the direction keys (right and left keys) as follows: The grayscale is set to be "black"→"dark gray"→"gray"→"bright gray"→"white" in this order as the adjustment level gauge 41 is moved from the left end to the right end, as shown in FIG. 4B.

After the user operates the adjustment level gauge 41 in the adjustment level setting screen D02 and determines the grayscale of the reference image G, the control section 17 changes the grayscale of the displayed reference image G to the determined grayscale and displays the changed reference image G (S03 in FIG. 2). Thereafter, when the user displays the luminance unevenness adjustment screen D01 (see FIG. 3) again and selects "start adjustment 32," the control section 17 instructs the OSD processing section 13 to superimpose and display an adjustment reference position selection screen D03 (see FIG. 5) on the reference image G (S04 in FIG. 2).

Figure 5:
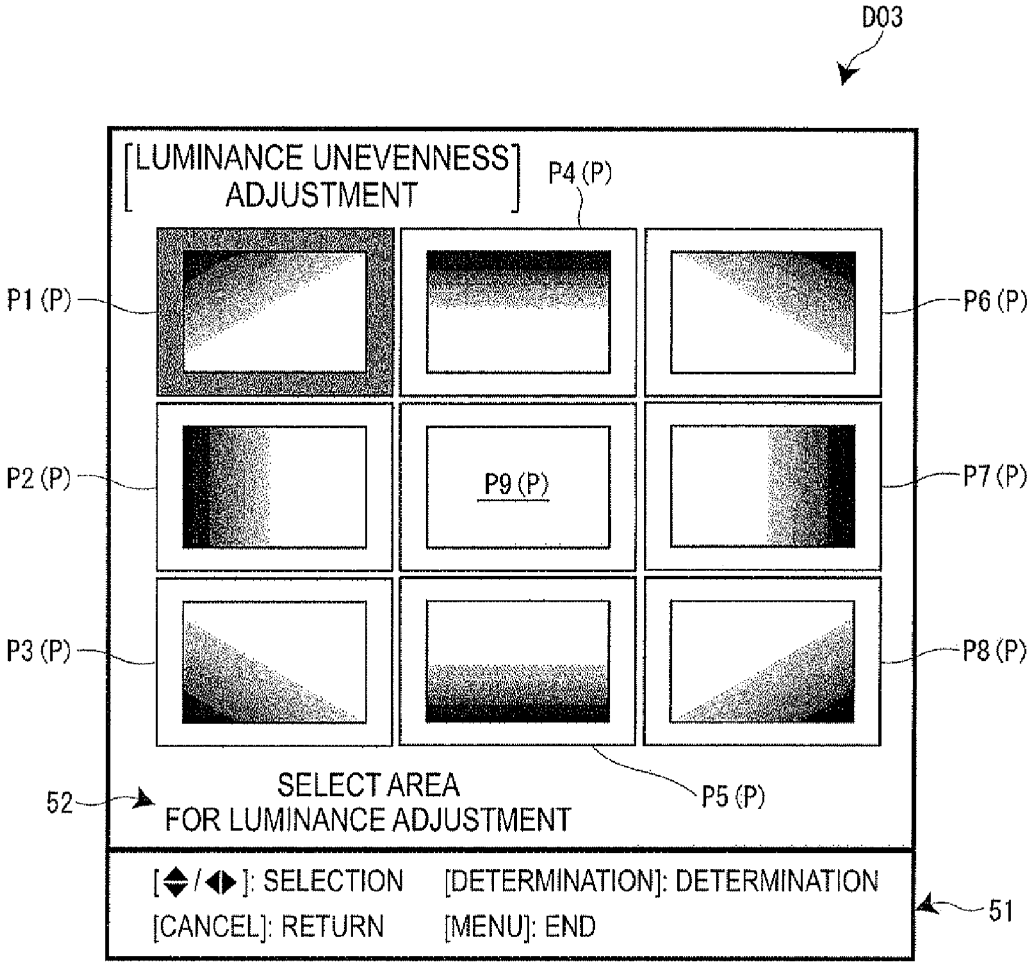
FIG. 5 describes an adjustment reference position selection screen.

In the adjustment reference position selection screen D03 are displayed nine pattern images P (P1 to P9) showing areas for luminance adjustment in the reference image G (that is, areas for luminance adjustment in pixel area 23*a*), operation guidance information 51, and a message 52 for the user ("select area for luminance adjustment"), as shown in FIG. 5.

The pattern images P are formed of a pattern image P1, which sets an upper left area of the reference image G (pixel area 23*a*) to be the area for luminance adjustment, a pattern image P2, which sets a left area to be the area for luminance adjustment, a pattern image P3, which sets a lower left area to be the area for luminance adjustment, a pattern image P4, which sets an upper area to be the area for luminance adjustment, a pattern image P5, which sets a lower area to be the area for luminance adjustment, a pattern image P6, which sets an upper right area to be the area for luminance adjustment, a pattern image P7, which sets a right area to be the area for luminance adjustment, a pattern image P8, which sets a lower right area to be the area for luminance adjustment, and a pattern image P9, which sets the entire reference image G (pixel area 23*a*) to be the area for luminance adjustment.

Further, the pattern images P not only simply show the areas for luminance adjustment but also visually display how the luminance in the areas is adjusted. For example, the pattern image P1 shows that when luminance adjustment is performed on the upper left area of the reference image G (pixel area 23*a*), the luminance is adjusted based on a pattern having gradation formed from the upper left corner of the image toward the center of the image (the same holds true for the pattern images P2 to P8). On the other hand, the pattern image P9 shows that the luminance of the entire reference image G (pixel area 23*a*) is adjusted to be a uniform value.

Further, one of the pattern images P1 to P9 is so displayed that the contour of the pattern image has a color different from those of the other eight pattern images. The different color shows that the pattern image P having the color is selected for luminance adjustment (FIG. 5 shows a state in which the pattern image P1 is selected).

Figure 6A:
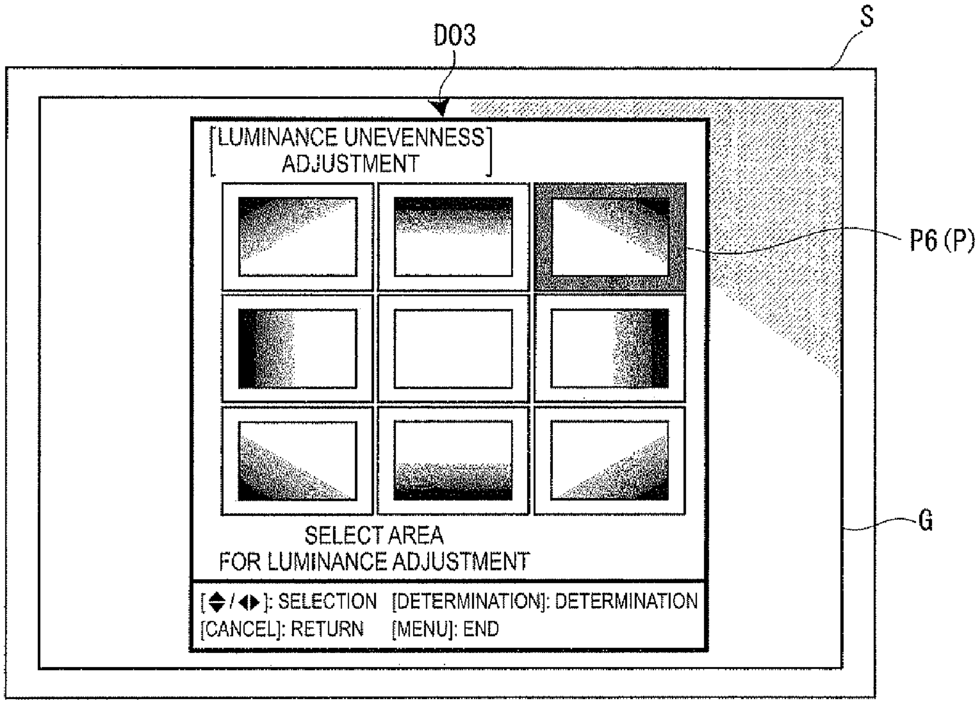
FIG. 6A describes operation of selecting a pattern image when luminance unevenness has occurred in an upper right area of an image, and FIG. 6B describes operation of selecting a pattern image when luminance unevenness correction is performed on an entire image.
Figure 6B:
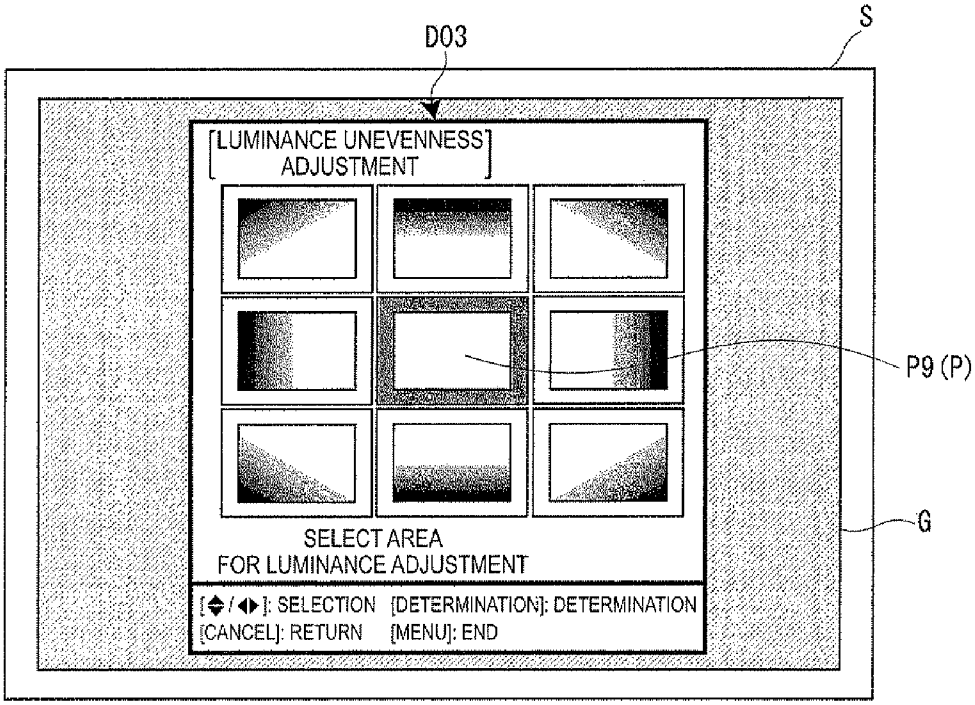
Figure 7:
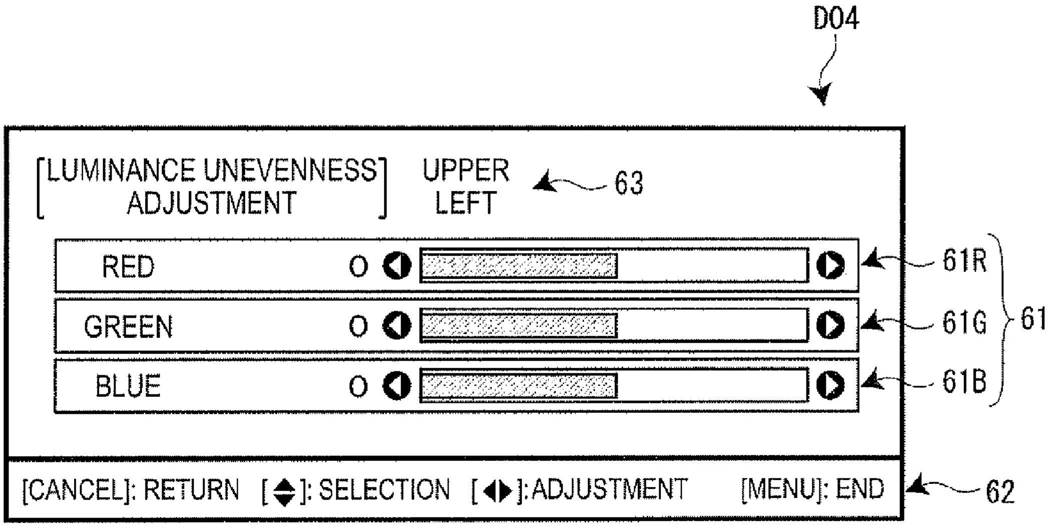
FIG. 7 describes an RGB adjustment screen.

The user visually identifies a position where luminance unevenness has occurred in the reference image G and selects a pattern image P corresponding to the position where luminance unevenness has occurred by operating the direction keys. For example, as shown in FIG. 6A, when the user recognizes that luminance unevenness (shaded portion in FIG. 6A) has occurred in the upper right area of the reference image G projected on the projection surface S, the user operates the direction keys to select the pattern image P6. Further, when the user recognizes that luminance adjustment is necessary for the entire reference image G as shown in FIG. 6B (for example, when the user recognizes that the entire reference image G is reddish (expressed as shaded portion in FIG. 6B)), the user operates the direction keys to select the pattern image P9.

Thereafter, when the user selects (determines) a desired pattern image P in the adjustment reference position selection screen D03, the control section 17 instructs the OSD processing section 13 to superimpose and display an RGB adjustment screen D04 (see FIG. 7) on the displayed image (S05 in FIG. 2).

It is noted that the RGB adjustment screen D04 is superimposed and displayed in a position where the RGB adjustment screen D04 does not overlap with the area for luminance adjustment indicated by the pattern image P selected by the user in the adjustment reference position selection screen D03 (or position where RGB adjustment screen D04 does not visually interfere with the pattern image P) (see FIG. 5). For example, when the user has selected the pattern image P1, the RGB adjustment screen D04 is displayed in a lower right portion of the reference image G because the upper left area of the reference image G is set to be the area for luminance adjustment. When the user has selected the pattern image P9, the RGB adjustment screen D04 is superimposed and displayed in a lower portion of the reference image G because the entire reference image G is set to be the area for luminance adjustment.

In the RGB adjustment screen D04 are displayed RGB adjustment gauges 61 (red adjustment gauge 61R, green adjustment gauge 61G, and blue adjustment gauge 61B), which are used to adjust the luminance for the color components, red (R), green (G), and blue (B), and operation guidance information 62. Further, a message 63 stating the position of the area for luminance adjustment is displayed in an upper portion of the screen (in FIG. 7, the message 63 states that the "upper left" area of the reference image G (pixel area 23*a*) is the area for luminance adjustment).

The user adjusts the luminance unevenness in the reference image G (pixel area 23*a*) by operating the direction keys to adjust the three RGB adjustment gauges 61. When the user operates the RGB adjustment gauges 61, the control section 17 instructs the unevenness correction section 14 to perform luminance adjustment (S06 in FIG. 2) according to the amount of adjustment made by using the RGB adjustment gauges 61 (amount of movement thereof) on the area for luminance adjustment (pixel area 23*a*) corresponding to the pattern image P selected in the adjustment reference position selection screen D03 (see FIG. 5).

That is, when luminance unevenness has occurred in the upper right area of the reference image G as shown in FIG. 6A, the luminance is adjusted based on a pattern having gradation formed from the upper right corner of the image toward the center of the image in accordance with the amount of adjustment made by using the RGB adjustment gauges 61. The luminance unevenness is thus corrected. Further, to adjust the luminance of the entire reference image G as shown in FIG. 6B, the luminance of the entire image is corrected by adjusting the luminance to be a uniform value in accordance with the amount of adjustment made by using the RGB adjustment gauges 61. It is noted that the correction in luminance over the enter reference image G is made, for example, for the following purpose: After luminance unevenness is corrected for one of the RGB colors by adjusting the luminance in the other eight areas, the luminance of the entire image is adjusted to correct discrepancies among the RGB colors (overall coloration).

As described above, according to the present embodiment, the luminance of an image (pixel area 23*a*) can be adjusted based on a pattern of an area for luminance adjustment corresponding to a pattern image P selected in accordance with user's luminance adjustment operation. That is, when the user recognizes that luminance unevenness has occurred in an image projected on the projection surface S, the user can correct the luminance unevenness by performing luminance adjustment on the area for luminance adjustment while looking at the image. The user can thus make the correction while visually grasping how the luminance unevenness in the image is actually corrected. Further, since no camera or any other imaging device is required, luminance unevenness can be corrected at a low cost.

The luminance unevenness correction described above is preferably performed on all grayscale reference images G settable in the adjustment level setting screen D02 (see FIGS. 4A and 4B). That is, the user performs the luminance adjustment on a reference image G having a certain grayscale ("white" reference image G, for example), followed by the luminance adjustment successively made in the same manner on reference images G of the other grayscales (reference images G of "bright gray," "gray," "dark gray," and "black") for more reliable luminance unevenness correction.

In the luminance unevenness correction, after the adjustment is made on a reference image G having one grayscale, the projector 1 (control section 17) may automatically display a reference image G having the following grayscale. The correction may be completed when the luminance adjustment is made on all grayscale reference images G.

In the present embodiment, the grayscale of the reference image G can be adjusted to the five levels, which are presented only by way of example and are not necessarily used. The number of adjustable grayscales may be smaller or greater than five.

In the present embodiment, an image is divided into nine areas for luminance adjustment but is not necessarily divided this way. An image may be divided into ten or more areas.

In the present embodiment, the light source portion 21 is formed of the discharged-type light source lamp 21*a*, which may be replaced with a laser, an LED, or any other solid-state light source.

In the present embodiment, the projector 1 displays an image based on the transmissive liquid crystal display method but may instead be based on a reflective liquid crystal display method, a DLP (digital light processing)® method, or any other display principle. The invention is also applicable to a rear-projection projector integrated with a transmissive screen, a liquid crystal display, and other image display apparatus as well as the projector 1.

Further, the functions (processes) of the projector 1 shown in the embodiment described above can be provided in the form of a program. In this case, the program can be provided in the form of a variety of recording media (such as CD-ROM and flash memory) on which the program is stored. That is, a program that causes a computer to function as the components of the projector 1 and a recording medium on which the program is recorded are also encompassed in the scope of the appended claims.

Moreover, the projector 1 is not necessarily configured as described in the above example, and the apparatus configuration, the process steps, and other factors of the projector 1 can be changed as appropriate to the extent that the changes do not depart from the substance of the invention.

What is claimed is:

1. An image display apparatus that displays an image modulated by a light modulator on an image display surface, the apparatus comprising:

an OSD display section that displays pattern images showing areas for luminance adjustment in the image;

a pattern image selection operation section that accepts selection of any of the displayed pattern images;

a luminance adjustment operation section that accepts operation of adjusting the luminance of the image; and a luminance correction section that adjusts the luminance of the image in the area for luminance adjustment corresponding to the selected pattern image in accordance with the operation accepted by the luminance adjustment operation section, wherein the pattern images are formed of at least one of: a pattern image that indicates any of an upper left area, a left area, a lower left area, an upper right area, a right area, a lower right area, an upper area, and a lower area of the image as the areas for luminance adjustment in the image; and a pattern image that sets the entire image to be the area for luminance adjustment, and prior to adjustment of the luminance of the image in the area for luminance adjustment by the luminance correction section, the OSD display section displays the pattern images such that each pattern image shows a distinct gradation of luminance indicating how the luminance in each pattern image will be adjusted if selected with the pattern image selection operation section.

2. The image display apparatus according to claim 1, further comprising a grayscale selection operation section that accepts operation of selecting a grayscale at which the luminance is desired to be adjusted, wherein the luminance correction section performs luminance adjustment at the grayscale selected by using the grayscale selection operation section on the area for luminance adjustment corresponding to the pattern image selected by using the pattern image selection operation section.

3. The image display apparatus according to claim 2, wherein the luminance correction section displays an image showing the grayscale selected by using the grayscale selection operation section on the image display surface by using the light modulator.

4. The image display apparatus according to claim 3, wherein the image showing the grayscale is a single-colored image.

5. The image display apparatus according to claim 1, wherein the luminance correction section performs the luminance adjustment for each of red, green, and blue components.

6. A method for correcting luminance unevenness produced in an image display apparatus that displays an image modulated by a light modulator on an image display surface, the method comprising:

displaying pattern images showing areas for luminance adjustment in the image;

accepting selection of any of the displayed pattern images; and adjusting the luminance of the image in the area for luminance adjustment corresponding to the selected pattern image in accordance with operation of adjusting the luminance of the image, wherein the pattern images are formed of at least one of: a pattern image that indicates any of an upper left area, a left area, a lower left area, an upper right area, a right area, a lower right area, an upper area, and a lower area of the image as the areas for luminance adjustment in the image; and a pattern image that sets the entire image to be the area for luminance adjustment, and prior to the adjusting of the luminance of the image in the area for luminance adjustment, the pattern images are displayed such that each pattern image shows a distinct gradation of luminance indicating how the luminance in each pattern image will be adjusted if selected.

7. An image display apparatus that displays an image modulated by a light modulator on an image display surface, the apparatus comprising:

an OSD display section that displays pattern images showing areas for luminance adjustment in the image;

a pattern image selection operation section that accepts selection of any of the displayed pattern images;

a luminance adjustment operation section that accepts operation of adjusting the luminance of the image;

a luminance correction section that adjusts the luminance of the image in the area for luminance adjustment corresponding to the selected pattern image in accordance with the operation accepted by the luminance adjustment operation section; and a grayscale selection operation section that accepts operation of selecting a grayscale at which the luminance is desired to be adjusted, wherein the luminance correction section performs luminance adjustment at the grayscale selected by using the grayscale selection operation section on the area for luminance adjustment corresponding to the pattern image selected by using the pattern image selection operation section.

* * * * *